United States Patent [19]

Moriwaki et al.

[11] 4,393,169

[45] Jul. 12, 1983

[54] MOLDABLE RESIN COMPOSITIONS CONTAINING POLYCARBONATE STYRENE POLYMER AND THREE PHASE GRAFT POLYMER

[75] Inventors: Takeshi Moriwaki, Sakai; Shinji Tokuhara, Himeji, both of Japan

[73] Assignee: Daicel Chemical Industries, Ltd., Sakai, Japan

[21] Appl. No.: 320,629

[22] Filed: Nov. 12, 1981

[51] Int. Cl.³ .................. C08L 25/04; C08L 69/00; C08L 51/00
[52] U.S. Cl. .................................. 525/67; 525/80; 525/82; 525/902
[58] Field of Search ........................... 525/67, 902

[56] References Cited

U.S. PATENT DOCUMENTS 3,793,402  2/1974  Owens .................................. 525/902
4,082,895  4/1978  Backderf et al. ..................... 525/67
4,204,047  5/1980  Margotte et al. .................... 525/67

Primary Examiner—Wilbert J. Briggs, Sr.
Attorney, Agent, or Firm—Flynn, Thiel, Boutell & Tanis

[57] ABSTRACT

A moldable resin composition comprising:
(A) an aromatic vinyl-type polymer;
(B) a polycarbonate; and
(C) a three-stage polymerization product produced by three-stage emulsion polymerizations of an aromatic vinyl-type monomer, butadiene, alkyl methacrylate, etc.

6 Claims, No Drawings

MOLDABLE RESIN COMPOSITIONS CONTAINING POLYCARBONATE STYRENE POLYMER AND THREE PHASE GRAFT POLYMER

This invention relates to a novel thermoplastic resin composition comprising blended polymers. More particularly, this invention relates to a novel thermoplastic resin composition having excellent heat-resistance and high shock resistance and showing neither pearly luster nor layer exfoliation.

Most moldable compositions employed generally in molding procedures and produced by blending a plurality of thermoplastic resins not only show pearly luster, but also, in some cases, produce layer exfoliation. Moreover, a product produced by molding such a composition is apt to show physical properties lower than those expected under the additive rule from the properties of the blended polymers. Particularly, the shock resistance is apt to be reduced.

For solving these problems, there have been proposed additions of specific resin components to the resin compositions. For instance, Japanese Patent Provisional Publications No. 50(1975)-46764, No. 53(1978)-18661 and No. 53(1978)-1246, and Japanese Patent Publication No. 52(1977)-503 disclose the improvements on blended mixtures of styrene copolymers with polycarbonates. An improvement in one physical property, however, sometimes gives adverse effects to other properties. For instance, an improvement on the heat resistance is often not followed by improvements on the shock resistance, particularly shock resistance at a low temperature. Moreover, if an extruder is employed for blending a copolymer comprising as one component an aromatic vinyl monomer and a 4,4'-dihydroxydiphenylalkane-type polycarbonate, the extrusion is not stably done and the extruding amount frequently varies to lower the workability. Furthermore, a molded product produced from such a composition shows not only the pearly luster, but also the layer exfoliation on a face given by breaking.

Accordingly, the object of the present invention is to provide a moldable resin composition free of the drawbacks described above. More specifically, the object of the invention is to provide a moldable resin composition comprising an aromatic vinyl-type polymer, a polycarbonate and a polymer which not only is free of the drawbacks of the known art such as pearly luster and layer exfoliation, but also is remarkably improved in the shock resistance at a low temperature.

The present invention provides a moldable resin composition which comprises:

100 parts by weight of a mixture comprising 95–5 parts by weight of (A) an aromatic vinyl-type polymer and 5–95 parts by weight of (B) a polycarbonate; and 1–20 parts by weight of (C) a polymer, that is, a three-stage polymerization product produced by three-stage emulsion polymerization.

The three-stage polymerization product identified as (C) in the above is produced by the following process:

the first stage in which 50–100% by weight of an aromatic vinyl-type monomer, 0–50% by weight of another vinyl-type monomer copolymerizable with said aromatic vinyl-type monomer, and 0–10% by weight of a multifunctional bridge-forming monomer are polymerized;

the second stage in which the polymer produced in the first stage, 50–100% by weight of butadiene, 0–50% by weight of a vinyl-type monomer copolymerizable therewith, and 0–1.0% by weight of a multifunctional bridge-forming monomer are subjected to the emulsion polymerization; and the third stage in which the polymer produced in the second stage, 50–100% by weight of an alkyl methacrylate having 1–4 carbon atoms in the alkyl group, 0–50% by weight of vinyl-type monomer copolymerizable therewith, and 0–10% by weight of a multifunctional bridge-forming monomer are subjected to the emulsion polymerization.

The present invention is further described hereinbelow more in detail.

The aromatic vinyl-type polymer identified herein as (A) is a homopolymer of an aromatic vinyl monomer such as styrene, α-methylstyrene or a halogen-substituted styrene, or a copolymer of the aromatic vinyl monomer with acrylonitrile, a methacrylic acid alkyl ester such as methyl methacrylate, maleic anhydride or the like. The polymer (A) can be one produced by polymerization in the presence of an elastomer such as polybutadiene or poly(acrylic acid ester). Examples of the aromatic vinyl-type polymers (A) include polystyrene, styrene-acrylonitrile copolymer (AS resin), syrene-methyl methacrylate copolymer (MS resin), acrylonitrile-butadiene-styrene copolymer (ABS resin) and styrene-meleic anhydride copolymer. In the aromatic vinyl-type polymer (A), an aromatic vinyl monomer unit is preferably present in an amount at least 30% by weight in the molecule. More preferred range is 50–90% by weight.

The polycarbonate identified herein as (B) is typically represented by a 4,4'-dihydroxydiphenylalkane-type polycarbonate. The 4,4'-dihydroxydiphenylalkane-type polycarbonate can be produced, for instance, by the transesterification method or the phosgene method employing 2,2-(4,4'-dihydroxydiphenyl)propane as a dihydroxy component.

According to the present invention, the aromatic vinyl-type polymer (A) and the polycarbonate (B) are employed in the ratio by weight of 95–5:5–95.

The three-stage polymerization product identified herein as (C) is a polymer produced by a process comprising three-stage emulsion polymerizations. The details of the process are described hereinbelow.

In the first stage emulsion polymerization, an aromatic vinyl-type monomer such as styrene, vinyltoluene or a halogen-substituted styrene is employed in the amount of 50–100% by weight of the total monomer amount employed in this stage. In the first stage, the following monomer is employable replacing a part of the aromatic vinyl-type monomer: a vinyl-type monomer different from the above-mentioned aromatic vinyl-type monomer and copolymerizable therewith, such as acrylonitrile, an acrylic acid ester or a methacrylic acid ester, in the amount of 0–50% by weight, preferably 0–20% by weight, of the total monomer amount employed in this stage. In this stage, a multifunctional bridge-forming monomer such as divinylbenene, diallyl maleate, diallyl fumarate, allyl methacrylate or ethyleneglycol dimethacrylate is also employable replacing a part of the aromatic vinyl-type monomer, in the amount of 0–10% by weight, preferably 0.2–6% by weight, of the total monomer amount employed in this stage.

The emulsion polymerization of the first stage can be carried out in a conventional manner.

The product given in the emulsion polymerization of the first stage is then introduced into the second stage in which the first stage product serves as a core product in the emulsion polymerization of the second stage.

In the second stage emulsion polymerization, butadiene is polymerized in the polymerization product of the first stage. The butadiene is employed in the amount of 50–100% by weight of the total monomer amount employed in this stage. Accordingly, a vinyl-type monomer copolymerizable with the polymerization product of the first stage and/or the butadiene is employable replacing a part of the butadiene, in the amount of 0–50% by weight of the total monomer amount employed in this stage. Also employable is the multifunctional bridge-forming monomer described for the first stage, in the amount of 0–1.0% by weight of the total monomer amount employed in this stage.

The emulsion polymerization of the second stage can be carried out in a conventional manner.

The product given in the emulsion polymerization of the second stage is then introduced into the third stage in which the second stage product serves as a core product in the emulsion polymerization of the third stage.

In the third stage emulsion polymerization, an alkyl methacrylate having 1–4 carbon atoms in the alkyl group is polymerized in the polymerization product of the second stage. The alkyl methacrylate is employed in the amount of 50–100% by weight, preferably 80–100% by weight, of the total monomer amount employed in this stage. Examples of the alkyl methacrylates include methyl methacrylate, ethyl methacrylate, isopropyl methacrylate, butyl methacrylate and isobornyl methacrylate. Further, a vinyl-type monomer copolymerizable with the polymerization product of the second stage and/or the alkyl methacrylate is employable replacing a part of the alkyl methacrylate, in the amount of 0–50% by weight, preferably 0–20% by weight, of the total monomer amount employed in this stage. Examples of the vinyl-type monomers include acrylonitrile, styrene, vinyl acetate, acrylic acid and methacrylic acid. Furthermore, the multifunctional bridge-forming monomer described for the first stage is also employable in the amount of 0–10% by weight, preferably 0.2–6% by weight, of the total monomer amount employed in this stage. Also employable is a small amount of a polymerization regulator such as mercaptan.

The emulsion polymerization of the third stage can be carried out in a conventional manner.

The product given in the emulsion polymerization of the third stage, that is, the three-stage polymerization product (C) is incorporated in the amount of 1–20 parts by weight into 100 parts by weight of the mixture of the aromatic vinyl-type polymer (A) and the polycarbonate (B). The incorporation of the product (C) in an amount less than 1 part by weight imparts little effect to the resin composition, and the incorporation in an amount more than 20 parts by weight extremely reduces the heat resistance of the resin composition so that the resin composition cannot be employed as a moldable resin composition.

The moldable resin composition may further comprise, if desired, a variety of additives employable in resin compositions, such as a flame retarder, stabilizer, and lubricant.

The blending and kneading of the resin composition can be carried out in a variety of manners. For instance, the component (A), the component (B), and the component (C), and additives, if desired, are blended in solutions and in optional orders, and then the solvent is evaporated. Otherwise, a liquid that precipitates these polymer components and additives is added to the polymer solution to precipitate the polymer composition (resin composition). These processes are preferred because the processes provide homogeneous compositions. However, a kneading process is, in practice, employed for the components in molten states. The kneading under molten conditions can be carried out in conventional kneading machines such as the banbury mixer, an extruder, and a variety of kneaders. In carrying out the kneading procedure, the resins are preferably converted into powders or fine particles and mixed in a tumbler or a vessel equipped with stirrer in advance of introducing into the kneading machine. The resins of the three kinds are preferably mixed at once and introduced in a kneading machine. The pre-mixing process can be eliminated, if possible, and each of the resins can be separately introduced into the kneading machine under measurement of the introduced amounts.

The novel thermoplastic moldable resin composition of the present invention can be employed for producing molded products which are economical, easily processable, excellently heat-resisting and highly shock-resisting, particularly, remarkably shock-resisting at a low temperature. Accordingly, molded products produced from the moldable resin composition of the invention can be employed in a variety of articles such as parts of electric devices, parts of various office equipments and copying machines, parts of furnitures and houses, parts of automobiles, safety caps, and helmet.

The present invention will be further described by the following examples.

EXAMPLES 1–5

Composition (A) Copolymer of 30 wt % of methyl methacrylate and 70 wt % of styrene
(B) Polycarbonate
   (Iupilon S 3000, available from Mitsubishi Gas Chemical Co., Ltd., Japan)
(C) Three-stage polymerization product produced by the three-stage polymerization involving:

| the first stage; | styrene | 27 parts |
|---|---|---|
| | diallyl maleate | 1 part |
| the second stage; | butadiene | 46.8 parts |
| | diallyl maleate | 0.2 part |
| the third stage; | methyl methacrylate | 25 parts |

(the part is part by weight, and the polymerization was carried out in emulsion and in a conventional manner.)

The components (A), (B) and (C) in the ratio designated in Table 1 were mixed in a Henschel mixer and then kneaded in a monoaxial extruder equipped with a screw (40 mm $\phi$, full flighted type). The cylinder temperature of the extruder was 230° C. and the rotating speed of the screw was 60 rpm.

The so obtained pellets of the resin composition were molded by injection to prepare a test piece, which was then examined on the appearance and the physical properties by the following procedures.

Test Procedures

Appearance: examined with eye

Izot Impact Strength: examined on a test piece with cutting notch in accordance with ASTM D-256, Temperature; 20° C., −20° C. and −40° C.

Thermal Deformation Temperature: examined in accordance with ASTM D-648, Fiber stress; 18.56 Kg/cm²

The results are set forth in Table 1.

COMPARISON EXAMPLE 1

The procedures of Example 2 were repeated except for employing no three-stage polymerization product.
The results are set forth in Table 1.

COMPARISON EXAMPLE 2

The procedures of Example 2 were repeated except for replacing the three-stage polymerization product with the two-stage polymerization product (methyl methacrylate—styrene—butadiene copolymer) produced through a process involving:

the first step; 46.8 parts by weight of butadiene and 0.2 part by weight were subjected to emulsion polymerization, and the second step; 50 parts by weight of the product of the first step, 25 parts by weight of methyl methacrylate and 27 parts by weight of styrene were subjectd to emulsion polymerization.

The results are set forth in Table 1.

tained from Daicel Co., Ltd., Japan (product name CEVIEN N010).

The results are set forth in Table 2.

EXAMPLE 7

The procedures of Example 2 were repeated except for replacing the methyl methacrylate—styrene copolymer (A) with a styrene—maleic anhydride copolymer obtained from ARCO Co., Ltd. (product name DYLARK 232).

The results are set forth in Table 2.

TABLE 2

|     |                                         | Example 6 | Example 7 |
|-----|-----------------------------------------|-----------|-----------|
| (A) | Styrene copolymer (wt. part)            | 40        | 40        |
| (B) | Polycarbonate (wt. part)                | 60        | 60        |
| (C) | Three-stage polymerization product (wt. part) | 10  | 10        |
| Appearance |                                  | Good      | Good      |
| Izod Impact Strength |                        |           |           |
| 20° C. (Kg · cm/cm)  |                        | 45        | 42        |
| −20 ° C.             |                        | 25        | 24        |
| −40° C.              |                        | 13        | 12        |
| Thermal Deformation (°C.) |                   | 105       | 111       |

We claim:

TABLE 1

|                                          | Example 1 | Example 2 | Example 3 | Example 4 | Example 5 | Comparison Example 1 | Comparison Example 2 |
|------------------------------------------|-----------|-----------|-----------|-----------|-----------|----------------------|----------------------|
| (A) Styrene Copolymer (wt. part)         | 40        | 40        | 40        | 50        | 30        | 40                   | 40                   |
| (B) Polycarbonate (wt. part)             | 60        | 60        | 60        | 50        | 70        | 60                   | 60                   |
| (C) Three-stage polymerization product (wt. part) | 5 | 10    | 15        | 10        | 10        | 0                    | 10*                  |
| Appearance                               | Good      | Good      | Good      | Good      | Good      | Pearly luster        | Good                 |
| Izod Impact Strength                     |           |           |           |           |           |                      |                      |
| 20° C. (Kg · cm/cm)                      | 38        | 44        | 49        | 38        | 47        | 4                    | 43                   |
| −20° C.                                  | 22        | 26        | 32        | 22        | 34        | 3                    | 18                   |
| −40° C.                                  | 12        | 14        | 17        | 10        | 19        | 2                    | 7                    |
| Thermal Deformation (°C.)                | 109       | 107       | 104       | 100       | 111       | 115                  | 108                  |

Remark 10*, 10 parts by weight of the two-stage polymerization product

The results indicate that the addition of the three-stage polymerization product improved the kneading conditions, caused no pearly luster, and enhanced the shock resistance. Also indicated is that the addition of the three-stage polymerization remarkably improved the shock resistance at low temperatures, as compared with the commercially available composition of Comparison Example 2. The thermal deformation temperature was slightly decreased by the addition of the three-stage polymerization product, but the so decreased thermal deformation temperature was still maintained at a high level.

EXAMPLE 6

The procedures of Example 2 were repeated except for replacing the methyl methacrylate—styrene copolymer (A) with a styrene—acrylonitrile copolymer obtained from Daicel Co., Ltd., Japan (product name CEVIEN N010).

1. A thermoplastic moldable resin composition, the resin components of which consist essentially of a blend of
   I. 100 parts by weight of a mixture comprising
      (A) from 95 to 5 parts by weight of an aromatic vinyl polymer, and
      (B) from 5 to 95 parts by weight of thermoplastic polycarbonate resin, and
   II. from 1 to 20 parts by weight of
      (C) a three-stage polymer produced by three, sequential, emulsion polymerization stages, wherein
         (1) in the first emulsion polymerization stage, a mixture of (a) from 50 to 100 percent by weight of first, aromatic, vinyl monomer, (b) from 0 to 50 percent by weight of second, vinyl monomer different from said first monomer and copolymerizable therewith and (c) from 0 to 10 percent by weight of a multifunctional bridge-forming monomer, is emulsion polymerized to obtain a first stage polymer, (2) in the second emulsion polymerization stage, a mixture of (a) said first stage polymer and (b) a monomer mixture of (i) from 50 to 100 percent by weight of butadiene, (ii) from 0 to 50 percent by weight of a third, vinyl monomer copolymerizable with said butadiene, and (iii) from 0 to 1 percent by weight of a multifunctional bridge-forming monomer, is emulsion polymerized to obtain a second stage polymer, and (3) in the third emulsion polymerization stage, a mixture of (a) said second stage polymer and (b) a monomer mixture of (i) from 50 to 100 percent by weight of an alkyl methacrylate having 1 to 4 carbon atoms in the alkyl group, (ii) from 0 to 50 percent by weight of a fourth, vinyl monomer different from said alkyl methacrylate and copolymerizable therewith, and (iii) from 0 to 10 percent by weight of a multifunctional bridge-forming monomer, is emulsion polymerized.

2. A thermoplastic moldable resin composition as claimed in claim 1, in which the polycarbonate resin (B) is prepared from a 4,4'-dihydroxydiphenylalkane.

3. A thermoplastic moldable resin composition as claimed in claim 1, in which said aromatic vinyl polymer (A) is selected from the group consisting of polystyrene, styrene-acrylonitrile copolymer, styrene-methyl methacrylate copolymer, styrene-maleic anhydride copolymer, and acrylonitrile-butadiene-styrene copolymer, said copolymers containing at least 30 percent by weight of styrene.

4. A thermoplastic moldable resin composition as claimed in claim 1, in which said first, aromatic vinyl monomer employed in the first emulsion polymerization stage is selected from the group consisting of styrene, vinyltoluene and halogen-substituted styrenes, and said second vinyl monomer copolymerizable with said first aromatic vinyl monomer is selected from the group consisting of acrylonitrile, acrylic acid esters and methacrylic acid esters.

5. A thermoplastic moldable resin composition as claimed in claim 1, in which said multifunctional bridge-forming monomer is selected from the group consisting of divinylbenzene, diallyl maleate, diallyl fumarate, allyl methacrylate and ethyleneglycol dimethyacrylate.

6. A thermoplastic moldable resin composition, the resin components of which consist essentially of a blend of I. 100 parts by weight of a mixture comprising
   (A) from 95 to 5 parts by weight of a copolymer of styrene and methyl methacrylate containing from 50 to 90 percent by weight of styrene,
   (B) from 5 to 95 parts by weight of thermoplastic polycarbonate resin based on a 4,4'-dihydroxydiphenylalkane, and II. from 1 to 20 parts by weight of
   (C) a three-stage polymer produced by three, sequential, emulsion polymerization stages, wherein
      (1) in the first emulsion polymerization stage, a mixture of (a) styrene and (b) from zero to 10 percent by weight of a multifunctional bridge-forming monomer, is emulsion polymerized to obtain a first stage polymer,
      (2) in the second emulsion polymerization stage, a mixture of (a) said first stage polymer and (b) a first monomer component of (i) butadiene, and (ii) from 0 to 1 percent by weight of a multifunctional bridge-forming monomer, is emulsion polymerized to obtain a second stage polymer, and
      (3) in the third emulsion polymerization stage, a mixture of (a) said second stage polymer and (b) a second monomer component of (i) methyl methacrylate, and (ii) from 0 to 10 percent by weight of a multifunctional bridge-forming monomer, is emulsion polymerized.

* * * * *